US012743527B2

(12) United States Patent
Cecchetti et al.

(10) Patent No.: US 12,743,527 B2
(45) Date of Patent: Sep. 22, 2026

(54) ARTIFICIAL INTELLIGENCE HARDENED COMPUTERS

(71) Applicant: Staris AI, Inc., Seattle, WA (US)

(72) Inventors: Adam Cecchetti, Seattle, WA (US); Austin Fath, Falls Church, VA (US)

(73) Assignee: STARIS AI, INC., Seattle, WA (US)

( * ) Notice: Subject to any disclaimer, the term of this patent is extended or adjusted under 35 U.S.C. 154(b) by 77 days.

(21) Appl. No.: 18/987,432

(22) Filed: Dec. 19, 2024

(65) Prior Publication Data

US 2025/0258925 A1 Aug. 14, 2025

Related U.S. Application Data

(60) Provisional application No. 63/551,685, filed on Feb. 9, 2024.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS 11,604,883 B2 * 3/2023 Bhalla .................. G06F 21/577
11,907,378 B2 * 2/2024 Gupta .................. G06F 21/577
2005/0283834 A1 * 12/2005 Hall .................. G06F 21/577 713/188
2013/0133075 A1 * 5/2013 Abadi .................. G06F 21/577 726/25
2019/0114435 A1 * 4/2019 Bhalla .................. G06F 21/55
2020/0285757 A1 * 9/2020 Bhalla .................. G06F 21/55

FOREIGN PATENT DOCUMENTS

CN 117077153 B * 1/2024 .......... G06F 21/577

* cited by examiner

*Primary Examiner* — Yonas A Bayou
(74) *Attorney, Agent, or Firm* — Amin, Turocy & Watson, LLP

(57) ABSTRACT

Artificial intelligence hardened computers (e.g., using a computerized tool), is enabled. For example, a method can comprise scanning, by a system comprising at least one processor, a database for information about a program, in response to scanning the database, determining, by the system, the information about the program, wherein the information about the program comprises: source code information representative of a source code of the program, and context information representative of a context applicable to the source code, based on the information about the program, generating, by the system, a security test tool, wherein the security test tool is configured to check for a security vulnerability of the program, and in response to determining the security vulnerability, generating, by the system, modified source code based on the source code and based on the security vulnerability, wherein the modified source code does not comprise the security vulnerability.

20 Claims, 10 Drawing Sheets

SYSTEM 102

BUS 108

MEMORY 104

PROCESSOR 106

COMPUTER EXECUTABLE COMPONENTS 110

112

114

116

118

CONTEXT STORE 120

122

VECTOR DB 124

126

128

TOOL(S) 130

SECURITY TEST TOOL 132

300

IoP 326

API 328

Process Engine 330

Results / State DB 316

REPL 332

Fuzzer 334

Debugger 336

Call Analysis 338

CodeGraph 340

CRS 302

API 304

Prompt System 306

Planning System 342

Identify 308

Review/Scoping 310

Verify 312

Fix 314

Results / State DB 316

Vector DB 124

Context Store 120

LLM 126

Model(s) 128

700

702 DETERMINING INFORMATION ABOUT A SYSTEM, WHEREIN THE INFORMATION ABOUT THE SYSTEM COMPRISES SYSTEM CODE INFORMATION REPRESENTATIVE OF A SYSTEM CODE OF THE SYSTEM AND CONTEXT INFORMATION REPRESENTATIVE OF A CONTEXT OF THE SYSTEM CODE

704 BASED ON THE INFORMATION ABOUT THE SYSTEM, GENERATING A SECURITY TEST TOOL, WHEREIN THE SECURITY TEST TOOL IS CONFIGURED TO CHECK FOR A SECURITY VULNERABILITY OF THE SYSTEM

706 IN RESPONSE TO DETERMINING THE SECURITY VULNERABILITY, GENERATING MODIFIED SYSTEM CODE BASED ON THE SYSTEM CODE AND BASED ON THE SECURITY VULNERABILITY, WHEREIN THE MODIFIED SYSTEM CODE DOES NOT COMPRISE THE SECURITY VULNERABILITY

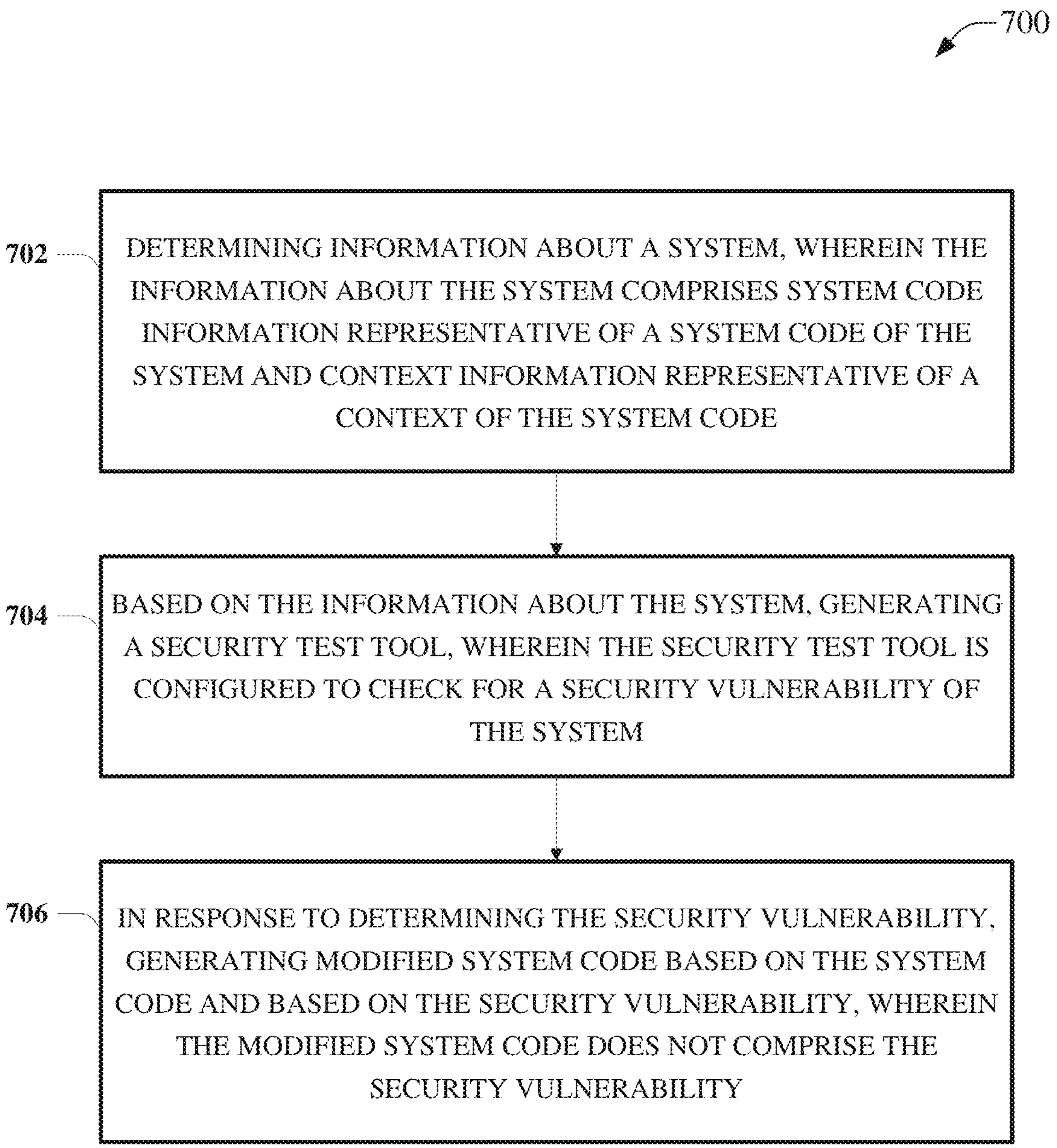

802 SCANNING, BY A SYSTEM COMPRISING AT LEAST ONE PROCESSOR, A DATABASE FOR INFORMATION ABOUT A PROGRAM

804 IN RESPONSE TO SCANNING THE DATABASE, DETERMINING, BY THE SYSTEM, THE INFORMATION ABOUT THE PROGRAM, WHEREIN THE INFORMATION ABOUT THE PROGRAM COMPRISES: SOURCE CODE INFORMATION REPRESENTATIVE OF A SOURCE CODE OF THE PROGRAM, AND CONTEXT INFORMATION REPRESENTATIVE OF A CONTEXT APPLICABLE TO THE SOURCE CODE

806 BASED ON THE INFORMATION ABOUT THE PROGRAM, GENERATING, BY THE SYSTEM, A SECURITY TEST TOOL, WHEREIN THE SECURITY TEST TOOL IS CONFIGURED TO CHECK FOR A SECURITY VULNERABILITY OF THE PROGRAM

808 IN RESPONSE TO DETERMINING THE SECURITY VULNERABILITY, GENERATING, BY THE SYSTEM, MODIFIED SOURCE CODE BASED ON THE SOURCE CODE AND BASED ON THE SECURITY VULNERABILITY, WHEREIN THE MODIFIED SOURCE CODE DOES NOT COMPRISE THE SECURITY VULNERABILITY

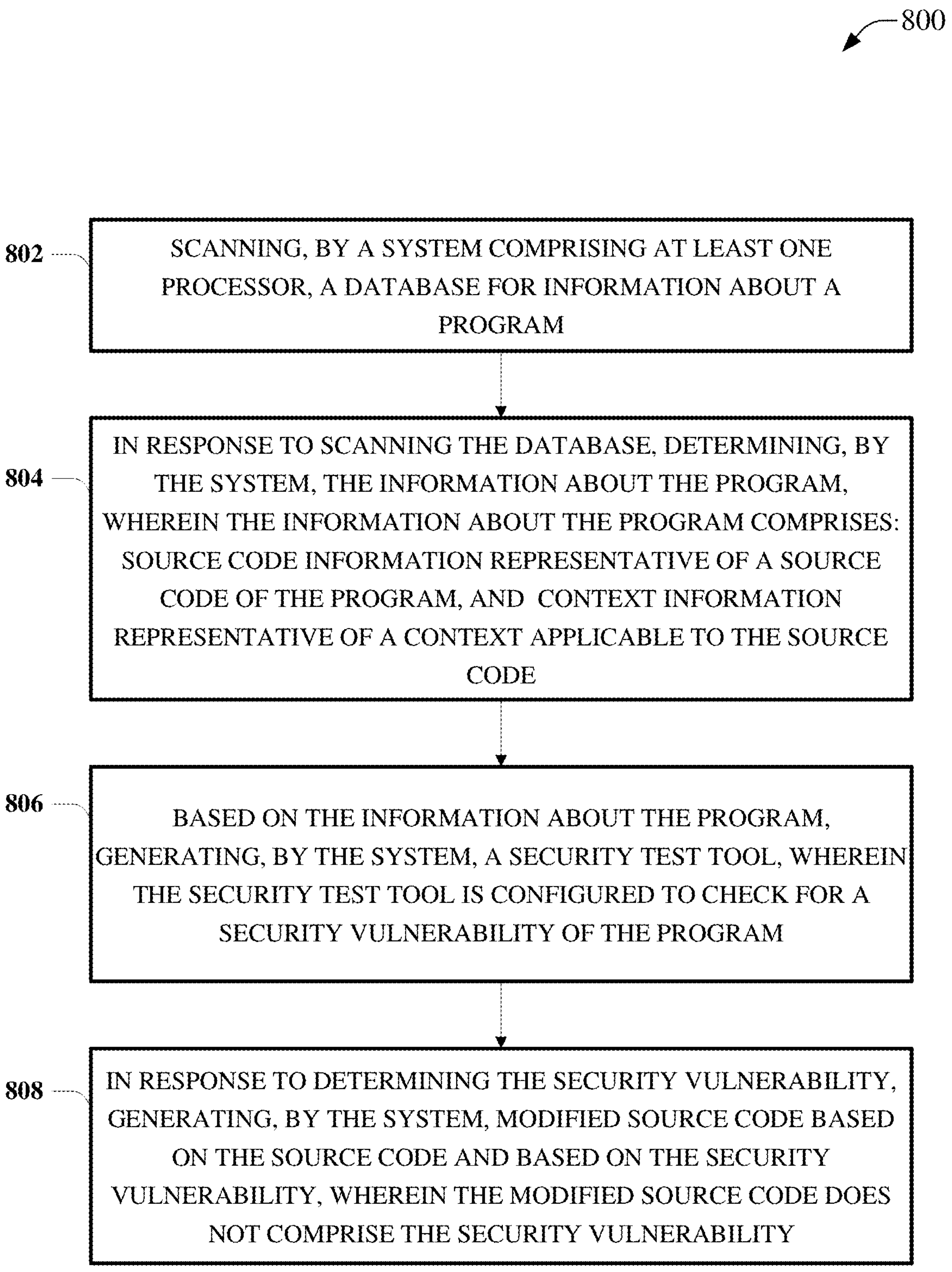

FIG. 8

ARTIFICIAL INTELLIGENCE HARDENED COMPUTERS

CROSS REFERENCE TO RELATED APPLICATIONS

This application claims the benefit of U.S. Provisional Patent Application No. 63/551,685, filed Feb. 9, 2024, and entitled AI Hardened Computers, which priority application is incorporated by reference herein in its entirety.

BACKGROUND

Conventional software analysis tools automatically analyze source code to identify issues, measure quality, and/or ensure adherence to coding standards. Such conventional software analysis tools can help developers write more efficient, maintainable, and error-free code by detecting potential bugs, vulnerabilities, performance bottlenecks, and/or code smells. However, existing software analysis tools lack context, actionable insights, and require manual intervention to correct identified problems.

The above-described background relating to software analysis tools is merely intended to provide a contextual overview of some current issues and is not intended to be exhaustive. Other contextual information may become further apparent upon review of the following detailed description.

BRIEF DESCRIPTION OF DRAWINGS

FIG. 7 is a flow diagram for a process associated with artificial intelligence hardened computers in accordance with one or more example embodiments described herein.

FIG. 8 is a flow diagram for a process associated with artificial intelligence hardened computers in accordance with one or more example embodiments described herein.

DETAILED DESCRIPTION

Figure 1:
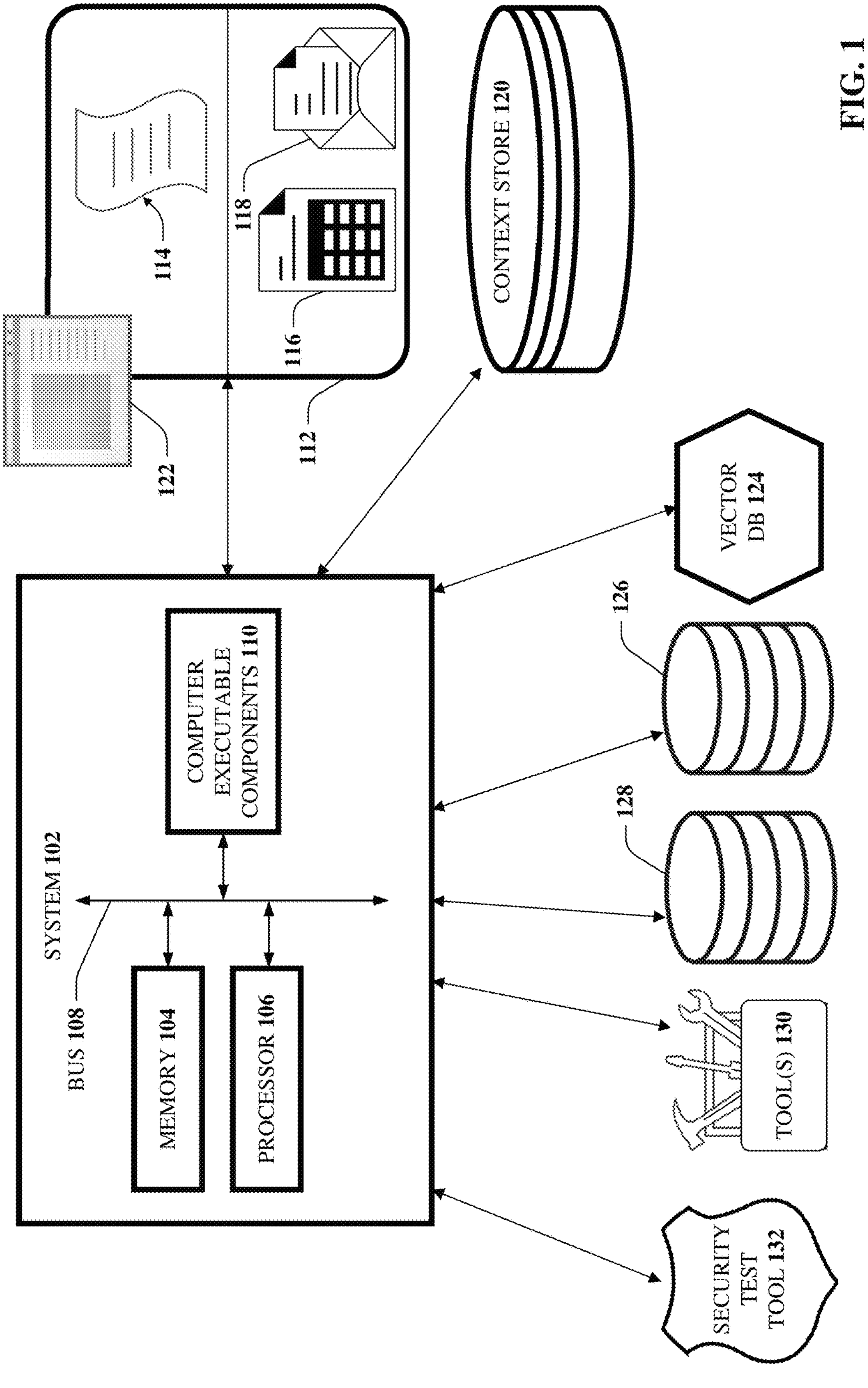
FIG. 1 is a block diagram of a non-limiting example system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, software analysis and remediation can be improved in various ways, and various example embodiments are described herein to this end and/or other ends.

According to an example embodiment, a system can comprise at least one processor, and at least one memory that stores executable instructions that, when executed by the processor, facilitate performance of operations, comprising scanning a file system for information about an application, in response to scanning the file system, obtaining the information about the application, wherein the information about the application comprises source code information representative of a source code of the application and context information representative of a context applicable to the source code, based on the information about the application, generating a security test tool, wherein the security test tool is configured to check for a security vulnerability of the application, and in response to determining the security vulnerability, generating modified source code based on the source code and based on the security vulnerability, wherein the modified source code does not comprise the security vulnerability.

In one or more example embodiments, the context information can be determined using a large language model. In this regard, the above operations can further comprise, using the large language model, generating a contextual model, wherein the security test tool is generated using the contextual model.

In one or more example embodiments, the security test tool can be generated using a large language model.

In one or more example embodiments, the above operations can further comprise testing the modified source code using the security test tool, wherein the modified source code is determined not to comprise the security vulnerability based on a result of testing the modified source code. In this regard, testing the modified source code can comprise testing the modified source code using a fuzzer tool or a read-eval-print loop (REPL) tool.

In one or more example embodiments, the above operations can further comprise replacing the source code with the modified source code.

In one or more example embodiments, the application can comprise a first instance of the application, and the above operations can further comprise, in response to the source code of the first instance of the application being replaced with the modified source code, applying the modified source code to a second instance of the application, other than the first instance of the application.

In one or more example embodiments, the context information can comprise at least one of use case information representative of a use case of the application, input information representative of one or more inputs to the application, output information representative of one or more outputs from the application, regulatory information representative of a regulatory compliance rule applicable to the application, an application programming interface applicable to the application, a file source applicable to the application, a file size applicable to the application, a source code file applicable to the application, hardware information representative of a hardware device associated with the application, a vector database applicable to the system, or a structured query language database applicable to the system.

In another example embodiment, a non-transitory machine-readable medium can comprise executable instructions that, when executed by a processor, facilitate performance of operations, comprising determining information about a system, wherein the information about the system comprises system code information representative of a system code of the system and context information representative of a context of the system code, based on the information about the system, generating a security test tool, wherein the security test tool is configured to check for a security vulnerability of the system, and in response to determining the security vulnerability, generating modified system code based on the system code and based on the security vulnerability, wherein the modified system code does not comprise the security vulnerability.

In one or more example embodiments, the above operations can further comprise, in response to a determination that the security vulnerability comprises a false positive, maintaining the system code and preventing a replacement of the system code with the modified system code.

In one or more example embodiments, the context information can comprise unstructured data, and the operations can further comprise, in response to a determination that the unstructured data satisfies a large language model criterion, determining the context using a large language model applied to the unstructured data.

In one or more example embodiments, the above operations can further comprise, based on the information about the system, generating a code graph applicable to the system, and rendering and visualizing the code graph via a graphical user interface. In this regard, the code graph can be generated using a large language model applied to the system.

In one or more example embodiments, the information about the system can further comprise at least one of: a document associated with the system, source code applicable to the system, or a design diagram applicable to the system.

In yet another example embodiment, a method can comprise scanning, by a system comprising at least one processor, a database for information about a program, in response to scanning the database, determining, by the system, the information about the program, wherein the information about the program comprises: source code information representative of a source code of the program, and context information representative of a context applicable to the source code, based on the information about the program, generating, by the system, a security test tool, wherein the security test tool is configured to check for a security vulnerability of the program, and in response to determining the security vulnerability, generating, by the system, modified source code based on the source code and based on the security vulnerability, wherein the modified source code does not comprise the security vulnerability.

In one or more example embodiments, the database can be repeatedly scanned, resulting in updated source code information and updated context information, and the security test tool can be repeatedly updated based on the updated source code information and the updated context information.

In one or more example embodiments, the above method can further comprise receiving, by the system, a prompt applicable to the program, wherein the context information is further determined based on the prompt.

In one or more example embodiments, the above method can further comprise determining, by the system, the context information using a large language model applied to the source code and to data associated with the source code.

In one or more example embodiments, the above method can further comprise determining, by the system, a vulnerability from a defined vulnerability database, wherein the security test tool is further generated based on the vulnerability.

Various embodiments herein utilize a knowledge-based approach, for instance, for a system herein to analyze a file or software system, application, or program. Source code alone lacks the full context required to correctly validate, prioritize, and remediate security vulnerabilities while ensuring software system objectives are maintained. Embodiments herein supplement source code with a generation of a language agnostic knowledge base of the system requirements, policies, objectives, and/or component structure. The knowledge base is utilized by a system herein, for instance, to improve the context and accuracy of a system's understanding of the software tasks. In this regard, various embodiments herein utilize a knowledge-based approach for software assisted security analysis, utilize system knowledge to provide accurate planning of security tasks, utilize system knowledge to limit the context required to execute security tasks, utilize generated tests to validate, utilize large language models, machine learning, and/or artificial intelligence (AI) to extract, persist, and/or validate knowledge of a given software system, utilize an event-based system for the orchestration, planning, and/or execution of software system tasks, and/or utilize a system knowledge graph.

Various embodiments herein can determine context and understanding of source code that has been forked and/or altered (e.g., for internal purposes) from mainline branches. Embodiments herein can utilize context, for instance, to apply patches to forked software. Further, embodiments herein can utilize software system knowledge to accurately plan and upgrade software systems, applications, programs, and/or services to defensible framework, libraries, and/or services. Various embodiments herein enable extraction of context, instrumentation of runtime, debugging, and/or other dynamic analysis methods to develop software patches herein. For instance, embodiments herein enable an event system to trigger the build and deployment of an upgraded, changed, or altered binary in response to a dynamically detected threat event or threat intelligence feed. Further, embodiments herein enable extraction of context to enable the back porting of a discovered code patch to multiple versions of software that may not match the source code in which it was found.

In various embodiments, AI hardened computers herein can comprise a class of computers that enable high trust adaptive computing environments. Such high trust adaptive computing environments can be required to be able to scale security with future engineering requirements, no/low code generation systems, and also for defense against hostile AI.

In various embodiments, an AI hardened computer herein can self-heal, auto-patch, and/or auto-upgrade, for instance, by autonomously finding issues, creating tests to confirm the issues, and creating fixes for said issues. Once approximate satisfiability is achieved via a convergence protocol, a system herein can generate and/or apply a fix (e.g., modified code) with a high level of confidence.

In various embodiments, an AI hardened computer herein can actively update itself in a loop or take in improvements from other AI as issues, upgrades, and/or changes as discovered. The foregoing facilitates increased performance, reliability, and correctness.

In various embodiments, cyber reasoning system (CRS) herein decompose penetration testing methodology into discrete, promptable steps. Large language models (LLMs) can be utilized, for instance, to extract context and structure from unstructured projects and code. Additionally, in various embodiments, the code generation capabilities of foundational LLMs are utilized. By combining extracted context and code generation, embodiments described herein can understand source code, find security issues, write tests to prune false positives, and/or produce fixes. In various embodiments, the CRS can also utilize the produced tests to refine and confirm whether code fixes are valid and complete. In various embodiments, the impact-oriented programming (IoP) system provides, for instance, a set of discrete tools to the CRS to provide further analysis, fuzz, debug, and/or REPL of code interfaces. In various embodiments, the CRS can decompose the penetration testing methodology into discrete, actionable, steps along the methodology using a combination of LLMs, tools, and/or event systems.

LLMs can be utilized herein, for instance, to extract context and/or structure from unstructured projects and code. This context enables the chaining of prompts and tools, via a system herein, to understand an application, program, or project, determine where to dive deeper, and/or when to abstract. Additionally, code generation and analysis capabilities of a system herein are utilized to read source code, understand use cases, deduce gaps in security, generate unit tests, propose fixes, and/or implement the fixes.

Each example step described herein is designed to perform context extraction and/or system enumeration. The CRS leverages, for instance, foundational models, tools, and/or data stores to compose each step of the methodology into a grounded action. In various embodiments, the CRS verifies and grounds extracted context and generated information to reality whenever possible. In various embodiments, by utilizing a system of feedback loops and chained analysis steps, false positives are minimized, for instance, to ensure a high state of integrity in the virtual penetration testing process. Additionally, in various embodiments, for dynamic testing and tool integration, the IoP system can be utilized, which provides application programming interfaces (APIs) for source code analysis and testing tools.

In various embodiments, during a scoping phase, a system herein can extract information about the project use cases, functions, API interface, code, dependencies, and/or other relevant information. In various embodiments, a system herein can determine the context directly from the files and code. In one or more embodiments, the directory structure, source tree, AST, comments, documents, and/or others suitable data sources can be utilized, by the system, to build up a context about the source code. This context is then utilized by the system to drive an analysis phase. In one or more embodiments, data representative of the context can be stored in a context store communicatively coupled to a system herein.

In one or more embodiments, a system herein enables an analysis phase, for instance, to find security issues in the code using tools, security prompts, and/or chained questions. The system performs analysis, for instance, by utilizing the extracted context use cases of the code and creating a test plan to find context aware security issues. In various embodiments, the system can perform the testing using one or more linked tools via the IoP system.

False positives are a common problem in conventional security automation. Conventional security analysis tools suffer from a lack of architectural or system context, thus requiring extensive customization or human review to validate false positive issues. To address this, in one or more embodiments described herein, reduction of the toil of false positives is achieved, for instance, via a system herein writing unit tests using the code generation capabilities of LLMs to trigger what the system determines to be a security issue. This test is then utilized by the system to help verify that a fix has been properly created by the system.

In various embodiments described herein, a system herein can identify source code, find security issues, write tests to prune false positives, and produce corresponding fixes. A system herein (e.g., via the CRS) also can utilize the produced tests to refine and confirm that code fixes are valid and complete. Further, embodiments herein enable monitoring of an application in a loop and looking for context outside of applications intended semantic function.

Turning now to FIG. 1, there is illustrated an example, non-limiting system 102 in accordance with one or more example embodiments herein. System 102 can comprise a computerized tool, which can be configured to perform various operations relating to AI hardened computers and systems. The system 102 can comprise one or more of a variety of components, such as memory 104, processor 106, bus 108, and/or computer executable components 110. In various example embodiments, one or more of the memory 104, processor 106, bus 108, and/or computer executable components 110 can be communicatively or operably coupled (e.g., over a bus or wireless network) to one another to perform one or more functions of the system 102. In various example embodiments, the system 102 can further comprise and/or be communicatively coupled to file system 112, context store 120, application 122, vector database (DB) 124, large language model (LLM) 126, model(s) 128, tool(s) 130, and/or security test tool 132.

Figure 2:
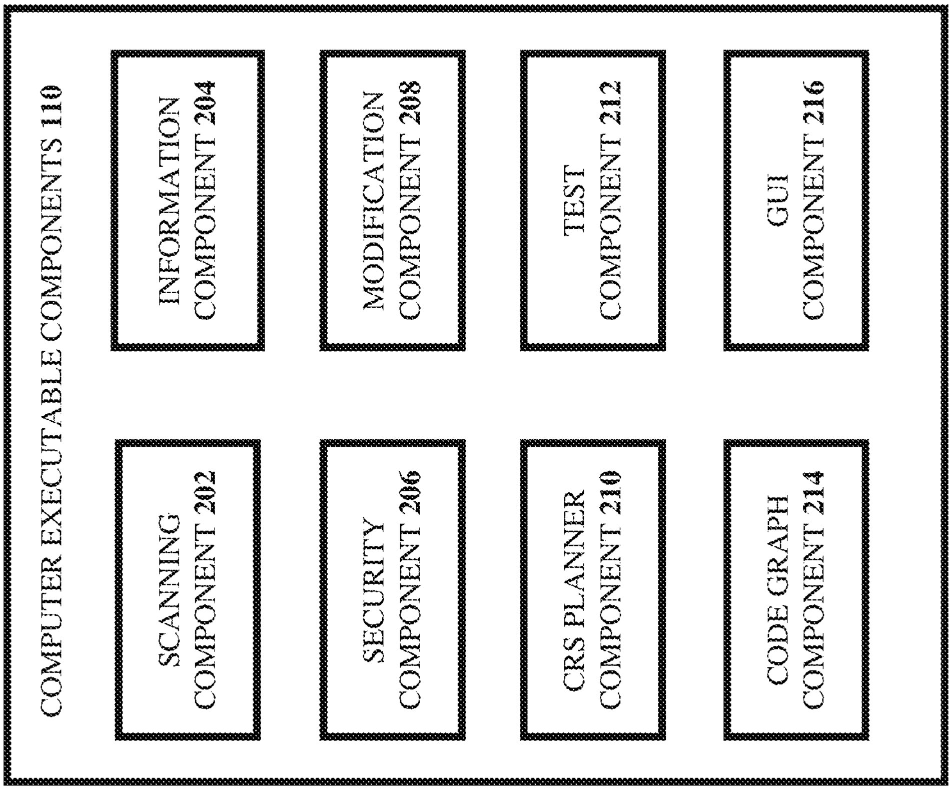
FIG. 2 is a block diagram of a non-limiting example computer executable modules in accordance with one or more example embodiments described herein.

FIG. 2 illustrates a block diagram of example, non-limiting computer executable components 110 in accordance with one or more embodiments described herein. As shown in FIG. 2, the one or more computer executable components 110 can comprise the scanning component 202, information component 204, security component 206, modification component 208, CRS planner component 210, test component 212, code graph component 214, and/or graphical user interface (GUI) component 216. It is noted that while various components described herein can perform one or more corresponding functions, processes, or actions, the computer executable components 110 as a whole and/or the processor 106 can be configured to perform one or more of the described functions, processor, or actions.

In various embodiments, the scanning component 202 can scan a file system 112 (or a database) for information about an application 122 (or a system or program). In this regard, the scanning component 202 can scan across folder, repository, monolithic repository, and/or library boundaries (e.g., for software system analysis herein). In various embodiments, the information about the application 122 can comprise, for instance, source code information representative of a source code 114 (e.g., system code) of the application 122 (or a system or program) and context information representative of a context applicable to the source code 114. Such context can be applicable to, for instance, applications, libraries, source, APIs, microservices, and/or application 122 architecture. In further embodiments, the information about the application 122 (or a system or program) can further comprise a document associated with the application

122 (or a system or program) and/or a design diagram applicable to the application 122 (or a system or program). The context information can comprise one or more of a variety of types of context information. For instance, such context information can comprise use-case information representative of a use-case of the application 122 (or a system or program), input information representative of one or more inputs to the application 122 (or a system or program), output information representative of one or more outputs from the application 122 (or a system or program), regulatory information representative of a regulatory compliance rule applicable to the application 122 (or a system or program), an application programming interface (API) applicable to the application 122 (or a system or program), a file source applicable to the application 122 (or a system or program), a file size applicable to the application 122 (or a system or program), a source code file applicable to the application 122 (or a system or program), hardware information representative of a hardware device associated with the application 122 (or a system or program), a vector database (e.g., vector DB 124) applicable to the application 122 (or a system or program), a structured query language (SQL) database applicable to the application 122 (or a system or program), and/or corresponding documents for context governance, risk and compliance (GRC), data classification policies.

In various embodiments, context determined herein (e.g., via the scanning component 202 and/or information component 204) can be stored to the context store 120. Such context data stored in the context store 120 can comprise one or more of a variety of suitable formats that can be utilized by the system 102.

In various embodiments, the GUI component 216 can receive a prompt (e.g., user input, a chat interface loop to suitable sources, or another suitable prompt) applicable to the application 122. In this regard, the context information can be further determined (e.g., via the information component 204) based on the prompt. In various embodiments, such a prompt can comprise a text-based input, an audio-based input, and/or a video-based input. Such a prompt can comprise, for instance, context information associated with the application 122 not otherwise available to the system 102.

In various embodiments, the information component 204 can, in response to scanning (e.g., via the scanning component 202) the file system 112 (or database), obtain the information about the application 122. In various embodiments a vector database (e.g., vector DB 124) can be utilized by the information component 204 to search for relevant vectors, relevant to the application 122 and/or associated context. In various example embodiments, searching (e.g., via the information component 204) for relevant vectors in the vector DB 124 can comprise determining (e.g., via the information component 204) vectors that are closest, or most similar to, a given input vector (e.g., an input vector associated with the application 122). In this regard, such vectors herein can represent data (e.g., text, images, or other suitable items) in a continuous vector space, in which similar items are located near each other. In various example embodiments, the vector search process can comprise a vector similarity search or nearest neighbor search (e.g., via the information component 204). In this regard, the vector DB 124 can comprise embedding vectors that have been translated (e.g., via the CRS planner component 210) from natural language in unstructured data herein.

In various embodiments, the security component 206 can generate an attack plan, which can comprise a list of items that the system 102 is to check for vulnerabilities. Such a vulnerability herein can comprise one or more of a variety of software vulnerabilities, such as a SQL injection, cross-site scripting (XSS), cross-site request forgery (CSRF), buffer overflow, command injection, directory traversal, insecure deserialization, broken authentication, session fixation, privilege escalation, insecure direct object references (IDOR), server-side request forgery (SSRF), code injection, clickjacking, XML external entities (XXE), open redirects, hardcoded credentials, unrestricted file upload, improper error handling, cryptographic weaknesses (e.g., weak hashing algorithms), unpatched software/vulnerabilities, misconfigured security headers, weak password policies, exposed APIs or endpoints, and/or insufficient logging and monitoring, among others. It is noted that the security component 206 can generate the attack plan based on the determined information about the application 122.

Additionally, or alternatively, in various embodiments, the security component 206 can, based on the information about the application 122, generate a security test tool 132. In this regard, the security test tool 132 can be configured to check for a security vulnerability of the application 122. In further embodiments, the security component 206 can determine a vulnerability from a defined vulnerability database (e.g., open web application security project (OWASP) top ten, or another suitable vulnerability database). In this regard, the security component 206 can further generate the security test tool 132 and/or the attack plan based on the determined vulnerability (e.g., a security vulnerability).

In various embodiments, the modification component 208 can, in response to determining the security vulnerability, generate modified source code based on the source code 114, based on the security vulnerability, and/or based on the determined context information. In this regard, the modified source code can be generated (e.g., via the modification component 208) not to comprise the security vulnerability. In one or more embodiments, the test component 212 can test the modified source code using the security test tool 132. In various embodiments, the test component 212 can execute the modified source code and the security test tool 132 in a secure environment (e.g., a sandbox environment). In this regard, the modified source code can be determined (e.g., via the test component 212) not to comprise the security vulnerability based on a result of testing the modified source code. In various embodiments, testing (e.g., via the test component 212) the modified source code can comprise testing the modified source code using a fuzzer tool and/or a REPL tool (e.g., of the tools 130). In various embodiments, the modification component 208 can replace the source code 114 with the modified source code (e.g., in response to a determination via the modification component 208 and/or the test component 212 that the modified source code comprises the vulnerability). In one or more embodiments, the modification component 208 can utilize the LLM 126 in order to generate the modified source code. In one or more embodiments, the modification component 208 can, in response to a determination that the security vulnerability comprises a false positive (e.g., in response to a determination via the modification component 208 and/or the test component 212 that the modified source code does not comprise the vulnerability), maintain the source code 114 and prevent a replacement of the source code 114 with the modified source code.

In one or more embodiments, the CRS planner component 210 can determine the context information herein using an LLM 126. In this regard, the information component 204 can generate a contextual model (e.g., of the model(s) 128)

using the LLM 126, and the security component 206 can then generate the security test tool 132 using the contextual model (e.g., of the model(s) 128). In some embodiments, the context information can comprise unstructured data 118. In this regard, the CRS planner component 210 can, in response to a determination that the unstructured data 118 satisfies an LLM criterion, determine the context using an LLM 126 applied to the unstructured data 118. Such an LLM criterion can comprise, for instance, a determination (e.g., via the CRS planner component 210) that data herein is unstructured (e.g., and thus difficult to understand without the LLM 126). In various embodiments, the unstructured data 118 can comprise, for instance, text-based documents, images, audio (e.g., spoken words), and/or video data. Such text-based documents can comprise, for instance, emails, notes, engineering files, word processor documents, spreadsheets, portable document format (PDF) documents, presentation files, consulting report analysis, bug bounty triage, ticket systems, text messages, instant messaging, static application security testing (SAST), dynamic application security testing (DAST), mark-up language documents, e-book formats, project management documents, or other suitable text-based documents. In this regard, the system 102 can enable an unstructured data retrieval interface. Further, the system 102 can facilitate the extraction and analysis of unstructured data 118 (e.g., via the CRS planner component 210). In this regard, the system 102 can employ techniques to retrieve relevant information from unstructured sources (e.g., unstructured data 118). For instance, the system 102 can utilize content parsing, which can comprise parsers for different types of unstructured data 118 (e.g., PDF parsers). The retrieval interface (e.g., via the system 102) can first search relevant vectors from vector DB 124, and then find the corresponding unstructured data trunk (e.g., paragraphs), then return to CRS planner component 210 for analysis via the LLM 126. In various embodiments, the CRS planner component 210 can utilize the LLM 126 for understanding of source, filters, and/or sinks for cross API and service usages, for extraction of context of authorization, authentication, and/or identity frameworks, for re-contextualizing security information for issues, for extraction and storage of security context for organization wide applications and systems, and/or to scope work and engagements.

In further embodiments, the context herein can be determined (e.g., via the information component 204) from structured data 116. Such structured data 116 can comprise, for instance, data structured according to a defined format natively compatible with the system 102. Such a defined format can comprise, for instance, tabular data, relational data, hierarchical data, key-value pairs, multidimensional data, time series data, graph data, geospatial data, categorical data, enumerations, flat file data, object-oriented data, network data, or other suitable structured data associated with the application 122.

In various embodiments, the CRS planner component 210 can generate the security test tool 132 using the LLM 126. In some embodiments, CRS planner component 210 can train the LLM 126 using supervised learning, while in other embodiments, the CRS planner component 210 can train the LLM 126 using unsupervised learning or semi-supervised learning. In various embodiments, the CRS planner component 210 can generate a threat model herein. Such a threat model can comprise, for instance, a structured approach to identifying, assessing, and/or addressing potential security threats and vulnerabilities in a software system (e.g., application 122). In various embodiments, the security component 206 and/or the CRS planner component 210 can find security vulnerabilities applicable to the application 122, tune, adjust, and/or configure tools 130 for finding security vulnerabilities, and/or facilitate chain analysis of combining multiple vulnerabilities security issues associated with the application 122.

In various embodiments, the application 122 can comprise a first instance of the application 122. In this regard, the modification component 208 can (e.g., in response to the source code 114 of the first instance of the application 122 being replaced with the modified source code) apply the modified source code to a second instance of the application (e.g., application 508 associated with file system 502 (or database) with respect to FIG. 5), other than the first instance of the application 122. The foregoing enables, for instance, cross organization protection, in which security issues or vulnerabilities are discovered cross organization and shared cross network for remediation. In this regard, embodiments herein enable tracking of structure changes in corporate policies and updating software and systems in subsidiaries and other partner organizations in response.

In various embodiments, the code graph component 214 can, based on the information about the application 122 (or a system or program), generate a code graph (e.g., code graph 340) applicable to the application 122 (or a system or program). The GUI component 216 can then render and/or visualize the code graph 340 via a GUI associated with the system 102 and/or the application 122 (e.g., via a display screen or another suitable GUI). In some embodiments, the CRS planner component 210 can generate the code graph using an LLM applied to the application 122 (or a system or program). In various embodiments, the code graph 340 can comprise a visual representation of the structure of the source code 114, for instance, focusing on relationships like function calls, dependencies, and/or control flows.

In various embodiments, scanning component 202 can repeatedly scan the file system 112 (or database), resulting in updated source code information and updated context information. In this regard, the security component 206 can repeatedly update the security test tool 132, for instance, based on the updated source code information and the updated context information. Thus, the system 102 can enable automatic re-evaluation of source code (e.g., source code 114) and applications (e.g., application 122) upon respective updates.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (AI) model and/or ML or an ML model that can learn to perform the above or below described functions (e.g., via training using historical training data and/or feedback data).

In some embodiments, the system 102 can comprise an AI and/or ML model that can be trained (e.g., via supervised and/or unsupervised techniques) to perform the above or below-described functions using historical training data comprising various context conditions that correspond to various augmented network optimization operations. In this example, such an AI and/or ML model can further learn (e.g., via supervised and/or unsupervised techniques) to perform the above or below-described functions using training data comprising feedback data, where such feedback data can be collected and/or stored (e.g., in memory) by the system 102. In this example, such feedback data can comprise the various instructions described above/below that can be input, for instance, to a system herein, over time in response to observed/stored context-based information.

AI/ML components herein can initiate an operation(s) associated with a function based on a defined level of confidence determined using information (e.g., feedback data). For example, based on learning to perform such functions described above using feedback data, performance information, and/or past performance information herein, the system 102 can initiate an operation associated with determining various thresholds herein.

In an embodiment, the system 102 can perform a utility-based analysis that factors cost of initiating the above-described operations versus benefit. In this embodiment, the system 102 can use one or more additional context conditions to determine various thresholds herein.

To facilitate the above-described functions, the system 102 can perform classifications, correlations, inferences, and/or expressions associated with principles of artificial intelligence. For instance, the system 102 can employ an automatic classification system and/or an automatic classification. In one example, the system 102 can employ a probabilistic and/or statistical-based analysis (e.g., factoring into the analysis utilities and costs) to learn and/or generate inferences. The system 102 can employ any suitable machine-learning based techniques, statistical-based techniques and/or probabilistic-based techniques. For example, the system 102 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the system 102 can perform a set of machine-learning computations. For instance, the system 102 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 3:
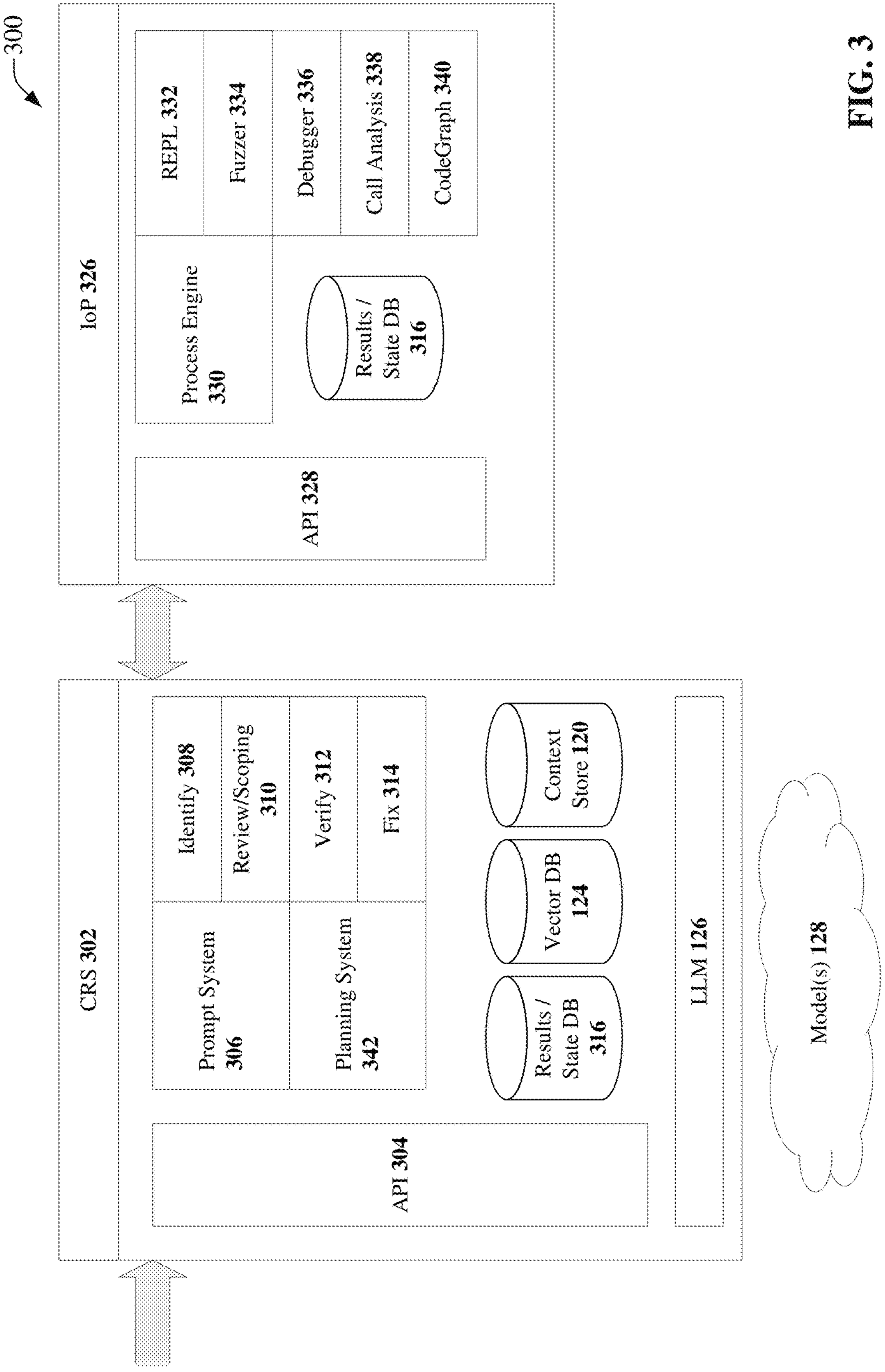
FIG. 3 is a block diagram of non-limiting system architecture in accordance with one or more example embodiments described herein.

FIG. 3 is a block diagram of non-limiting system architecture 300 in accordance with one or more example embodiments described herein. In various embodiments, the architecture 300 can comprise the CRS 302, IoP 326, and/or foundational model(s) 128. It is noted that the system 102 can comprise the CRS 302, IoP 326, and/or model(s) 128, and that the architecture 300 can, in one or more embodiments, comprise a system architectural view of the system 102, for instance, with actional steps shown in the architecture 300 for purposes of illustration.

In one or more embodiments, the CRS 302 can comprise API 304, prompt system 306, planning system 342, results/state DB 316, vector DB 124, context store 120, and/or LLM 126. In various embodiments, the prompt system 306 can comprise the identify 308 step and the review/scoping 310 step. The identify 308 step can comprise generating (e.g., via the system 102) an understanding and categorizing the contents of an application 122, program and/or system. In this regard, the identify 308 step can comprise obtaining (e.g., via the system 102) information about the application 122, program and/or system, such as languages, frameworks, and/or other suitable information. The review/scoping 310 step can comprise determining and/or obtaining (e.g., via the system 102) access to foundational information application 122, program and/or system. In various embodiments, the system 102 can obtain access (e.g., credentials) to source code 114, structured data 116, unstructured data 118, and/or other suitable data applicable to the application 122.

In various embodiments, the planning system 342 can comprise a virtual hacking tool, which can comprise the verify 312 step and the fix 314 step. The verify 312 step can comprise, for instance, based on information about the system and the determined understanding of the application 122, program and/or system, testing (e.g., via the system 102) the application 122, program and/or system, building and increasing knowledge and identifying for threats, and then verifying those threats. In the verify 312 step, the system 102 can generate a threat model (e.g., of the models 128), which can be based on a use case of the application 122, program and/or system, to identify potential threats and then test that threat model. The fix 314 step can comprise, for instance, based on the context and the threat, generating (e.g., via the system 102) a modification to the source code 114 or application 122, program and/or system in order to mitigate a corresponding vulnerability. In various embodiments, the planning system 342 can extract (e.g., via the system 102) a use case and threat model from an application 122, program, and/or software system, and then determine which tools 130 to utilize to verify and fix software problems (e.g., vulnerabilities).

The results/state DB 316 can comprise, for instance, a repository used to store, manage, and/or retrieve (e.g., via the system 102) data related to outcomes or states applicable to the CRS 302, derived between runs of the CRS 302. Similarly, the vector DB 124 can comprise vectors that represent data (e.g., text, images, or other suitable items) in a continuous vector space, in which similar items are located near each other. In various example embodiments, the vector search process can comprise a vector similarity search or nearest neighbor search (e.g., via the information component 204). In this regard, the vector DB 124 can comprise embedding vectors that have been translated (e.g., via the CRS planner component 210) from natural language in unstructured data 118 herein. The context store 120 can comprise a repository for context determined (e.g., via the CRS planner component 210) about an application (e.g., application 122), program, and/or system herein.

In various embodiments, the IoP 326 can comprise API 328, process engine 330, results/state DB 316, REPL 332, fuzzer 334, debugger 336, call analysis 338, and/or code graph 340. In various embodiments, the process engine 330 can determine which of the tools 130 (e.g., the REPL 332, fuzzer 334, debugger 336, call analysis 338, code graph 340, and/or other suitable tools) to utilize. In various embodiments, the REPL 332 can read inputs (e.g., source code 114), evaluate the source code 114, generate a result, and loop back to accept more input. The REPL 332 can be utilized by the system 102, for instance, for experimentation with source code 114 and/or testing and debugging small snippets of code without needing a full compilation cycle. In various embodiments, the fuzzer 334 can automatically generate random, invalid, and/or unexpected inputs to the application 122 to find, for instance, bugs, vulnerabilities, and/or security flaws. The fuzzer 334 can, for instance, identify edge cases that could cause crashes or undefined behavior and/or identify potential exploits or weaknesses in source code 114. In various embodiments, the fuzzer 334 can provide inputs to the application 122 and observe its behavior (e.g., crashes, memory leaks, or other behavior). In various embodiments, the debugger 336 can enable execution of an application 122, step-by-step, inspection of variables, and/or identification of issues or bugs in the source code 114. In various embodiments, call analysis 338 can comprise examination (e.g., via the system 102) of the sequence and relationships of function calls in an application 122, for instance, to understand its execution flow or detect inefficiencies and/or vulnerabilities. In this regard, the call analysis 338 can analyze (e.g., via the system 102) control flow and dependencies between functions, identify unintentional recursive calls, dead code, or inefficiencies, and/or debug or optimize performance. In various embodiments, the code graph 340 can comprise a visual representation of the structure of source code 114, for instance, focusing on relationships like function calls, dependencies, and/or control flows.

Figure 4:
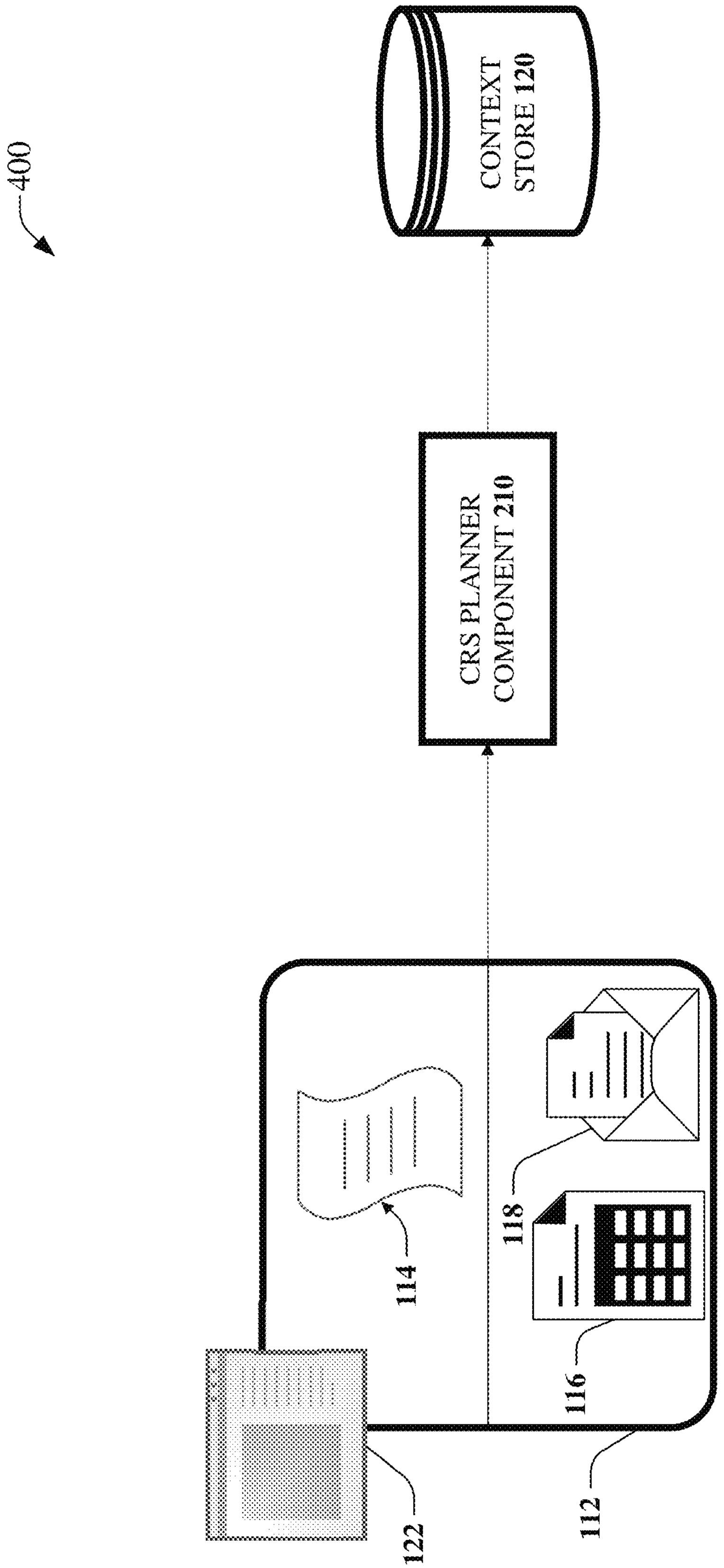
FIG. 4 is a diagram of example context derivation in accordance with one or more example embodiments described herein.

FIG. 4 is a diagram of example context derivation 400 in accordance with one or more example embodiments described herein. In various example embodiments, the CRS planner component 210 can repeatedly apply the LLM 126 to the unstructured data 118 of the file system 112 (or database) into data (e.g., in a defined data format) stored in the context store 120. The transforming (e.g., via the CRS planner component 210) of the unstructured data 118 into context data can comprise one or more of a variety of steps, such as data identification and collection, preprocessing and data cleansing, tokenization, natural language processing, feature extraction, structuring the data, use of machine learning models, and/or data storage in a structured format, among other suitable steps. The foregoing can transform (e.g., via the CRS planner component 210) the unstructured data 118 into a defined schema, such as into rows and columns of data stored, for instance, in the context store 120.

Figure 5:
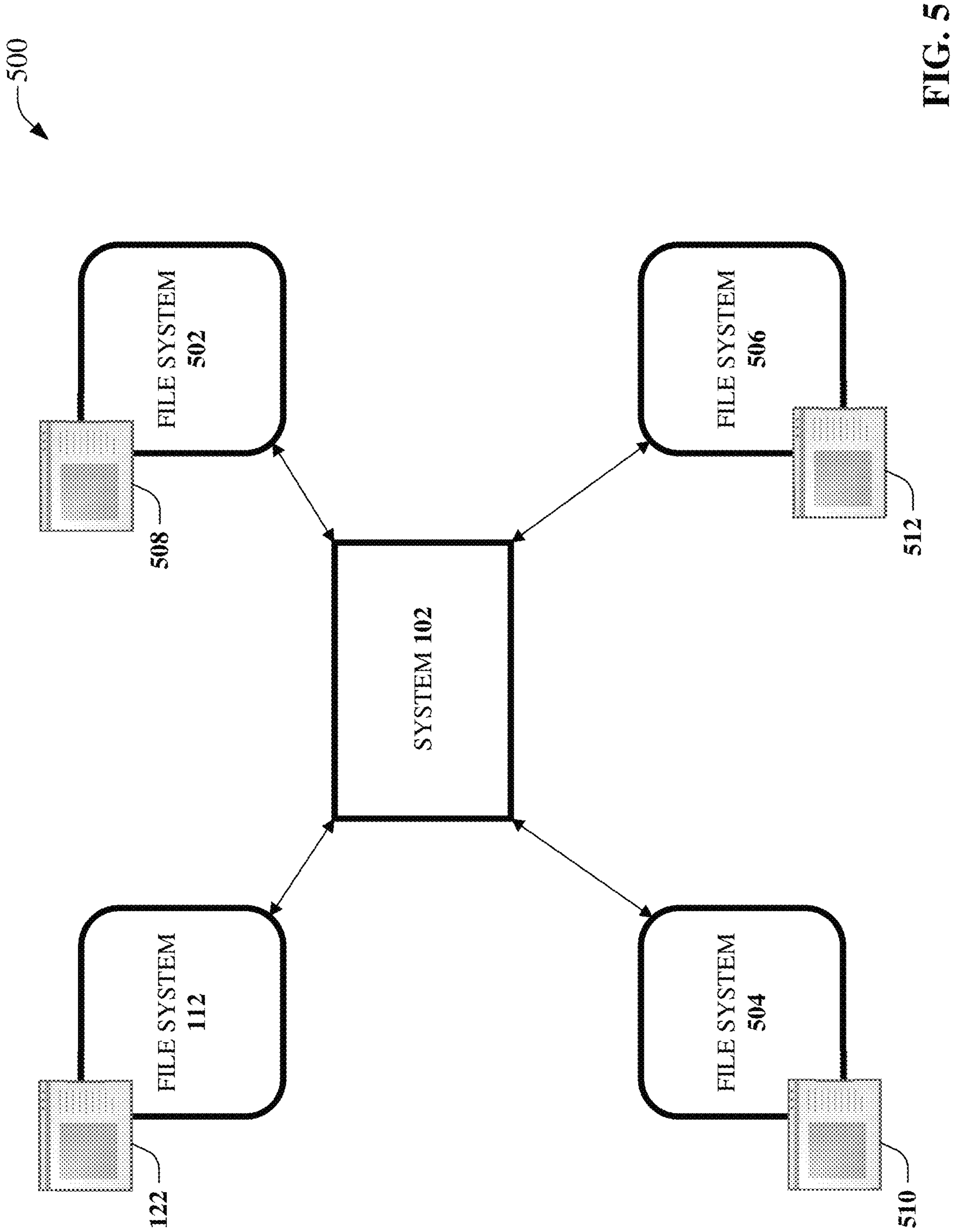
FIG. 5 is a block diagram of non-limiting system architecture in accordance with one or more example embodiments described herein.

FIG. 5 is a block diagram of non-limiting system architecture 500 in accordance with one or more example embodiments described herein. As shown in FIG. 5, the system 102 can be communicatively coupled to one or more file system(s) which can respectively comprise one or more application(s). For instance, the system 102 can be communicatively coupled to file system 112 (e.g., comprising application 122), file system 502 (e.g., comprising application 508), file system 504 (e.g., comprising application 510), and/or file system 506 (e.g., comprising application 512). The foregoing enables, for instance, cross organization protection, in which security issues or vulnerabilities are discovered cross organization and shared cross network for remediation. In this regard, embodiments herein enable tracking of structure changes in policies and updating software and systems in subsidiaries and other partner organizations in response. For example, a vulnerability in the application 122 identified and subsequently fixed (e.g., via the system 102). The system 102 can then apply this fix to an application 508 (e.g., in response to a determination that the application 508 comprises the vulnerability determined with respect to the application 122). The same can apply to the application 510 and/or application (e.g., and/or corresponding file system(s)).

Figure 6:
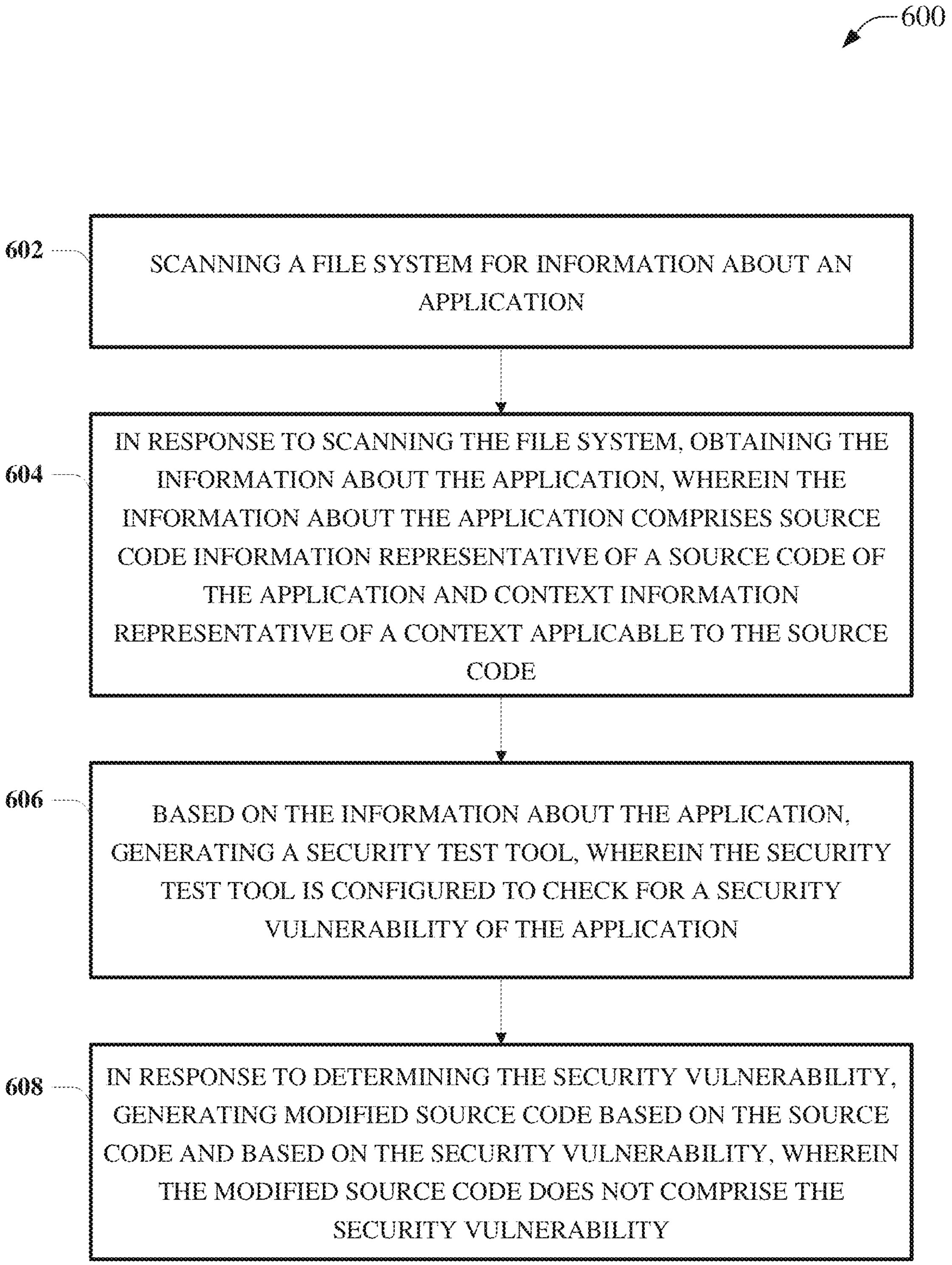
FIG. 6 is a flow diagram for a process associated with artificial intelligence hardened computers in accordance with one or more example embodiments described herein.

FIG. 6 illustrates a flow diagram for a process 600 associated with AI hardened computers in accordance with one or more embodiments described herein. At 602, the process 600 can comprise scanning (e.g., via the scanning component 202) a file system (or database) (e.g., file system 112) for information about an application (e.g., application 122). At 604, the process 600 can comprise, in response to scanning the file system (or database), obtaining (e.g., via the information component 204) the information about the application (e.g., application 122), wherein the information about the application comprises source code information representative of a source code (e.g., source code 114) of the application (e.g., application 122) and context information representative of a context applicable to the source code (e.g., source code 114). At 606, the process 600 can comprise, based on the information about the application (e.g., application 122), generating (e.g., via the security component 206) a security test tool (e.g., security test tool 132), wherein the security test tool (e.g., security test tool 132) is configured to check for a security vulnerability of the application (e.g., application 122). At 608, the process 600 can comprise, in response to determining the security vulnerability, generating (e.g., via the modification component 208) modified source code based on the source code (e.g., source code 114) and based on the security vulnerability, wherein the modified source code does not comprise the security vulnerability.

FIG. 7 illustrates a flow diagram for a process 700 associated with AI hardened computers in accordance with one or more embodiments described herein. At 702, the process 700 can comprise determining (e.g., information component 204) information about a system (e.g., application 122 or file system 112), wherein the information about the system (e.g., file system 112) (or database) comprises system code information representative of a system code (e.g., source code 114) of the system (e.g., application 122 or file system 112) and context information representative of a context of the system code (e.g., source code 114). At 704, the process 700 can comprise, based on the information about the system, generating (e.g., via the security component 206) a security test tool (e.g., security test tool 132), wherein the security test tool (e.g., security test tool 132) is configured to check for a security vulnerability of the system (e.g., application 122 or file system 112). At 706, the process 700 can comprise, in response to determining the security vulnerability, generating (e.g., via the modification component 208) modified system code based on the system code (e.g., source code 114) and based on the security vulnerability, wherein the modified system code does not comprise the security vulnerability.

FIG. 8 illustrates a flow diagram for a process 800 associated with AI hardened computers in accordance with one or more embodiments described herein. At 802, the process 800 can comprise scanning (e.g., via the scanning component 202), by a system (e.g., system 102) comprising at least one processor (e.g., processor 106), a database (e.g., file system 112) for information about a program (e.g., application 122). At 804, the process 800 can comprise, in response to scanning the database (e.g., file system 112), determining (e.g., via the information component 204), by the system (e.g., system 102), the information about the program (e.g., application 122), wherein the information about the program comprises: source code information representative of a source code (e.g., source code 114) of the program, and context information representative of a context applicable to the source code. At 806, the process 800 can comprise, based on the information about the program, generating (e.g., via the security component 206), by the system (e.g., system 102), a security test tool (e.g., security test tool 132), wherein the security test tool (e.g., security test tool 132) is configured to check for a security vulnerability of the program (e.g., application 122). At 808, the process 800 can comprise, in response to determining the security vulnerability, generating (e.g., via the modification component 208), by the system (e.g., system 102), modified source code based on the source code (e.g., source code 114) and based on the security vulnerability, wherein the modified source code does not comprise the security vulnerability.

Figure 9:
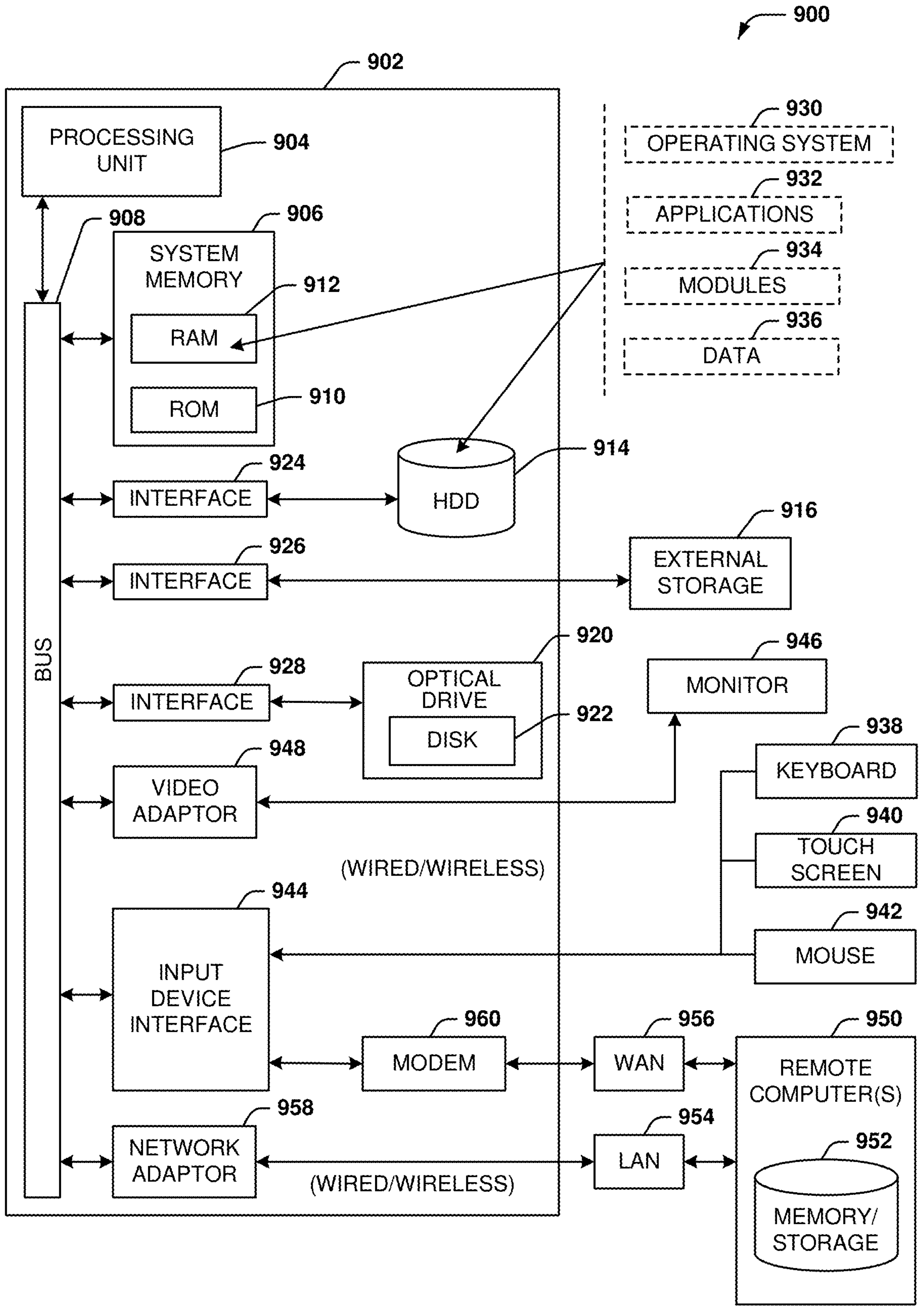
FIG. 9 is an example, non-limiting computing environment in which one or more embodiments described herein can be implemented.

In order to provide additional context for various example embodiments described herein, FIG. 9 and the following discussion are intended to provide a brief, general description of a suitable computing environment 900 in which the various example embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, modules, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically crasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various example embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies.

Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
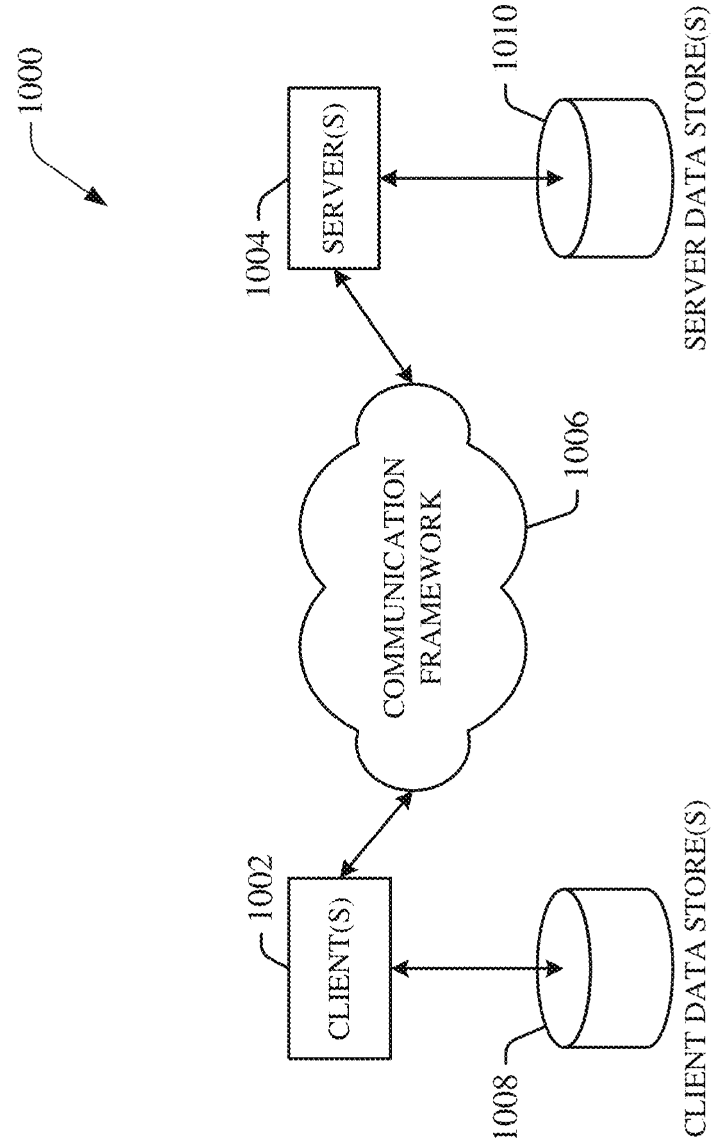
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookic(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various example embodiments. It is, of course, not possible to describe every conceivable combination of components, modules, or methods for purposes of describing the disclosed subject matter, and one skilled in the art may recognize that further combinations and permutations of the various example embodiments are possible. The disclosed subject matter is intended to embrace all such alterations, modifications, and variations that fall within the spirit and scope of the appended claims.

With regard to the various functions performed by the above-described components, modules, devices, circuits, systems, etc., the terms (including a reference to a "means") used to describe such components or modules are intended to also include, unless otherwise indicated, any structure(s) which performs the specified function of the described component or module (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various example embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

scanning a file system for information about an application;

in response to scanning the file system, obtaining the information about the application, wherein the information about the application comprises source code information representative of a source code of the application and context information representative of a context applicable to the source code;

based on the information about the application, generating a security test tool, wherein the security test tool is configured to check for a security vulnerability of the application;

in response to determining the security vulnerability, generating modified source code based on the source code and based on the security vulnerability, wherein the modified source code does not comprise the security vulnerability; and testing the modified source code using the security test tool, wherein the modified source code is determined not to comprise the security vulnerability based on a result of testing the modified source code, wherein testing the modified source code comprises testing the modified source code using a fuzzer tool or a read-eval-print loop tool.

2. The system of claim 1, wherein the context information is determined using a large language model.

3. The system of claim 2, wherein the operations further comprise:

using the large language model, generating a contextual model, wherein the security test tool is generated using the contextual model.

4. The system of claim 1, wherein the security test tool is generated using a large language model.

5. The system of claim 1, wherein the operations further comprise:

replacing the source code with the modified source code.

6. The system of claim 1, wherein the application comprises a first instance of the application, and wherein the operations further comprise:

in response to the source code of the first instance of the application being replaced with the modified source code, applying the modified source code to a second instance of the application, other than the first instance of the application.

7. The system of claim 1, wherein the context information comprises at least one of:

use case information representative of a use case of the application, input information representative of one or more inputs to the application, output information representative of one or more outputs from the application, regulatory information representative of a regulatory compliance rule applicable to the application, an application programming interface applicable to the application, a file source applicable to the application, a file size applicable to the application, a source code file applicable to the application, hardware information representative of a hardware device associated with the application, a vector database applicable to the system, or a structured query language database applicable to the system.

8. The system of claim 1, wherein the information about the application further comprises at least one of: a document associated with the application, source code applicable to the application, or a design diagram applicable to the application.

9. A non-transitory machine-readable medium, comprising executable instructions that, when executed by at least one processor, facilitate performance of operations, comprising:

determining information about a system, wherein the information about the system comprises system code information representative of a system code of the system and context information representative of a context of the system code;

based on the information about the system, generating a security test tool, wherein the security test tool is configured to check for a security vulnerability of the system; and in response to determining the security vulnerability, generating modified system code based on the system code and based on the security vulnerability, wherein the modified system code does not comprise the security vulnerability, wherein the information about the system further comprises at least one of: a document associated with the system, source code applicable to the system, or a design diagram applicable to the system.

10. The non-transitory machine-readable medium of claim 9, wherein the operations further comprise:

in response to a determination that the security vulnerability comprises a false positive, maintaining the system code and preventing a replacement of the system code with the modified system code.

11. The non-transitory machine-readable medium of claim 9, wherein the context information comprises unstructured data, and wherein the operations further comprise:

in response to a determination that the unstructured data satisfies a large language model criterion, determining the context using a large language model applied to the unstructured data.

12. The non-transitory machine-readable medium of claim 9, wherein the operations further comprise:

based on the information about the system, generating a code graph applicable to the system; and rendering and visualizing the code graph via a graphical user interface.

13. The non-transitory machine-readable medium of claim 12, wherein the code graph is generated using a large language model applied to the system.

14. The non-transitory machine-readable medium of claim 9, wherein the operations further comprise:

replacing the system code with the modified system code.

15. A method, comprising:

scanning, by a system comprising at least one processor, a database for information about a program;

in response to scanning the database, determining, by the system, the information about the program, wherein the information about the program comprises:

source code information representative of a source code of the program, and context information representative of a context applicable to the source code;

based on the information about the program, generating, by the system, a security test tool, wherein the security test tool is configured to check for a security vulnerability of the program;

in response to determining the security vulnerability, generating, by the system, modified source code based on the source code and based on the security vulnerability, wherein the modified source code does not comprise the security vulnerability; and determining, by the system, the context information using a large language model applied to the source code and to data associated with the source code.

16. The method of claim 15, wherein the database is repeatedly scanned, resulting in updated source code information and updated context information, and wherein the security test tool is repeatedly updated based on the updated source code information and the updated context information.

17. The method of claim 15, further comprising:

receiving, by the system, a prompt applicable to the program, wherein the context information is further determined based on the prompt.

18. The method of claim 15, further comprising:

determining, by the system, a vulnerability from a defined vulnerability database, wherein the security test tool is further generated based on the vulnerability.

19. The method of claim 15, further comprising:

replacing, by the system, the source code with the modified source code.

20. The method of claim 15, wherein the information about the program further comprises at least one of: a document associated with the program, source code applicable to the program, or a design diagram applicable to the program.

* * * * *